(12) United States Patent
Ishida

(10) Patent No.: US 8,654,522 B2
(45) Date of Patent: Feb. 18, 2014

(54) SUPPORT DEVICE AND A SLIDABLE PORTABLE DEVICE SUPPORTED THEREON

(75) Inventor: Yoshiharu Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 13/402,641

(22) Filed: Feb. 22, 2012

(65) Prior Publication Data

US 2012/0217854 A1  Aug. 30, 2012

(30) Foreign Application Priority Data

Feb. 25, 2011  (JP) .................................. 2011-040662

(51) Int. Cl.
*G06F 1/16* (2006.01)

(52) U.S. Cl.
USPC ............... 361/679.41; 248/346.03; 455/575.3

(58) Field of Classification Search
USPC ............... 361/679.41; 455/575.1, 575.3, 557; 248/346.03
See application file for complete search history.

(56) References Cited

U.S. PATENT DOCUMENTS

| | | | |
|---|---|---|---|
| 7,675,746 B2 * | 3/2010 | Crooijmans et al. ...... | 361/679.41 |
| 7,911,779 B1 * | 3/2011 | Tarnoff ..................... | 361/679.43 |
| 7,956,577 B2 * | 6/2011 | Fujii et al. ...................... | 320/114 |
| 8,145,821 B2 * | 3/2012 | Mead et al. .................... | 710/303 |
| 8,325,476 B2 * | 12/2012 | Huang et al. ............. | 361/679.41 |
| 8,532,723 B2 * | 9/2013 | Ahn et al. .................... | 455/575.4 |
| 2007/0041426 A1 | 2/2007 | Hashimoto | |
| 2008/0307144 A1 * | 12/2008 | Minoo ......................... | 710/304 |
| 2010/0173674 A1 * | 7/2010 | Fujii et al. .................... | 455/557 |
| 2010/0173683 A1 * | 7/2010 | Fujii et al. .................... | 455/573 |
| 2013/0039521 A1 * | 2/2013 | Zhou et al. .................... | 381/333 |

FOREIGN PATENT DOCUMENTS

| | | |
|---|---|---|
| JP | 10-513614 A | 12/1998 |
| JP | 2003-309637 A | 10/2003 |
| JP | 2006-303994 A | 11/2006 |
| JP | 2007-082194 A | 3/2007 |
| WO | 96/16499 A1 | 5/1996 |

* cited by examiner

*Primary Examiner* — Lisa Lea Edmonds
(74) *Attorney, Agent, or Firm* — Maschoff Brennan

(57) ABSTRACT

A support device includes a base, a fitting portion, a first holding portion and a second holding portion. The fitting portion, to which a portable device is fitted, is provided in the base, the fitting portion includes a support surface that supports the portable device and a side surface continuous with the support surface. The first holding portion is provided at a first distance from the support surface and fixed to the side surface. The second holding portion is provided at a second distance from the support surface and is projected from and retracted into the side surface, the second distance being smaller than the first distance.

13 Claims, 8 Drawing Sheets

SUPPORT DEVICE AND A SLIDABLE PORTABLE DEVICE SUPPORTED THEREON

CROSS-REFERENCE TO RELATED APPLICATIONS

This application is based upon and claims the benefit of priority from the prior Japanese Patent Application No. 2011-40662 filed on Feb. 25, 2011, the entire contents of which are incorporated herein by reference.

FIELD

This embodiment relates to a support device and a system.

BACKGROUND

Some known support devices have a recessed fitting portion to which a portable device is fitted.

A support device may be provided with a protruding holding portion for holding a portable device fitted to a fitting portion to prevent the portable device from falling off from the fitting portion. For example, when the holding portion is provided on a side surface of the fitting portion, the portable device is fitted to the fitting portion of the support device by being inserted between the holding portion and a support surface of the fitting portion for supporting the portable device. The portable device is removed from the fitting portion by being taken out from between the holding portion and the support surface of the fitting portion. In general, the holding portion of this type is provided at a predetermined position of the support device, taking into consideration the external dimensions of the portable device that is supposed to be fitted.

Portable devices capable of changing their forms based on the mode of use are known. In some cases, when a portable device is fitted to the fitting portion, a large gap may be left between the holding portion and the portable device fitted to the fitting portion due to its form, leading to a problem in that the holding portion cannot hold the portable device. Furthermore, the portable device may interfere with the holding portion, which may prevent the portable device from being fitted to or removed from the support device. Such a portable device capable of changing its form sometimes needs to be returned to a predetermined form when fitted to or removed from the support device.

Furthermore, as described above, the holding portion is provided at a predetermined position of the support device, taking into consideration the external dimensions of one type of the portable device that is supposed to be fitted. Therefore, when the support device is shared by a plurality of types of portable devices having different external dimensions, the support device may be unable to hold the portable devices. In addition, as described above, the portable device may interfere with the holding portion and may be unable to be fitted to the support device.

SUMMARY

According to an embodiment, a support device includes a base, a fitting portion, a first holding portion and a second holding portion. The fitting portion, to which a portable device is fitted, is provided in the base and, the fitting portion includes a support surface that supports the portable device and a side surface continuous with the support surface. The first holding portion is provided at a first distance from the support surface and fixed to the side surface. The second holding portion is provided at a second distance from the support surface and is projected from and retracted into the side surface, the second distance being smaller than the first distance.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

DETAILED DESCRIPTION OF THE EMBODIMENTS

Figure 1A:
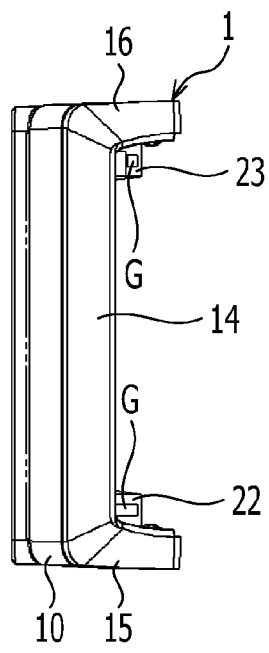
FIGS. 1A, 1B, 1C, and 1D show the exterior of a support device according to this embodiment.
Figure 1B:
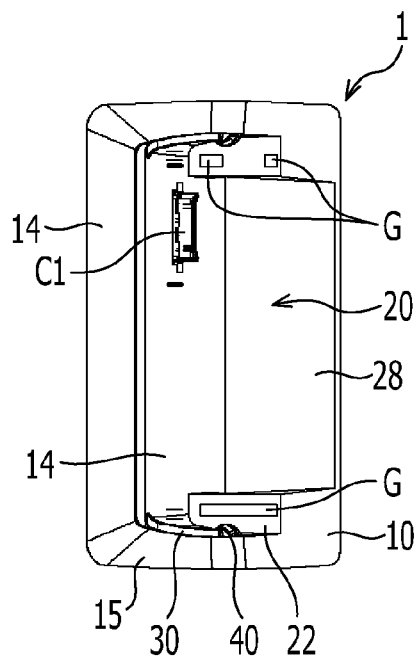
Figure 1C:
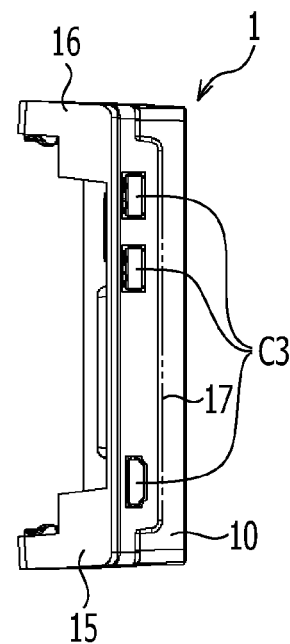
Figure 1D:
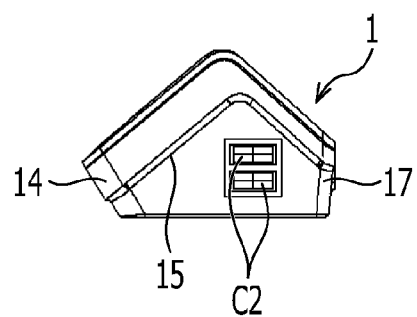

FIGS. 1A, 1B, 1C, and 1D show the exterior of a support device 1 according to this embodiment. The support device 1 includes a base 10 and a fitting portion 20. The fitting portion 20 is formed on the base 10, and a portable device (described below) can be fitted thereto. The support device 1 has functions to transmit data to and receive data from the portable device connected to the support device 1 and to charge the portable device. The support device 1 may also be referred to as a "cradle".

The base 10 is made of, for example, synthetic resin. The fitting portion 20 is recessed. The fitting portion 20 has support surfaces 22 and 23, a bottom surface 24, and an offset surface 28. The support surfaces 22 and 23 support the portable device fitted to the fitting portion 20. The bottom surface 24 supports the lower edge of the portable device fitted to the fitting portion 20. The offset surface 28 is a surface separated by a distance from the portable device fitted to the fitting portion 20. The offset surface 28 helps a user grab the portable device fitted to the fitting portion 20. The bottom surface 24 is provided with a connector C1 that is connected to the portable device.

The base 10 has a front portion 14, side walls 15 and 16, and a back portion 17. The front portion 14 defines the bottom surface 24 of the fitting portion 20. The side walls 15 and 16 define the support surfaces 22 and 23 of the fitting portion 20, respectively. The side wall 15 and the back portion 17 are provided with a connector C2 and a connector C3, respectively, via which data are transmitted and received between the portable device connected to the connector C1 and an external device. The fitting portion 20 has holding portions 30 and 40 on the side wall 15. Similarly, the fitting portion 20 has the holding portions 30 and 40 on the side wall 16. The holding portions 30 are an example of a first holding portion, and the holding portions 40 are an example of a second holding portion.

Figure 2:
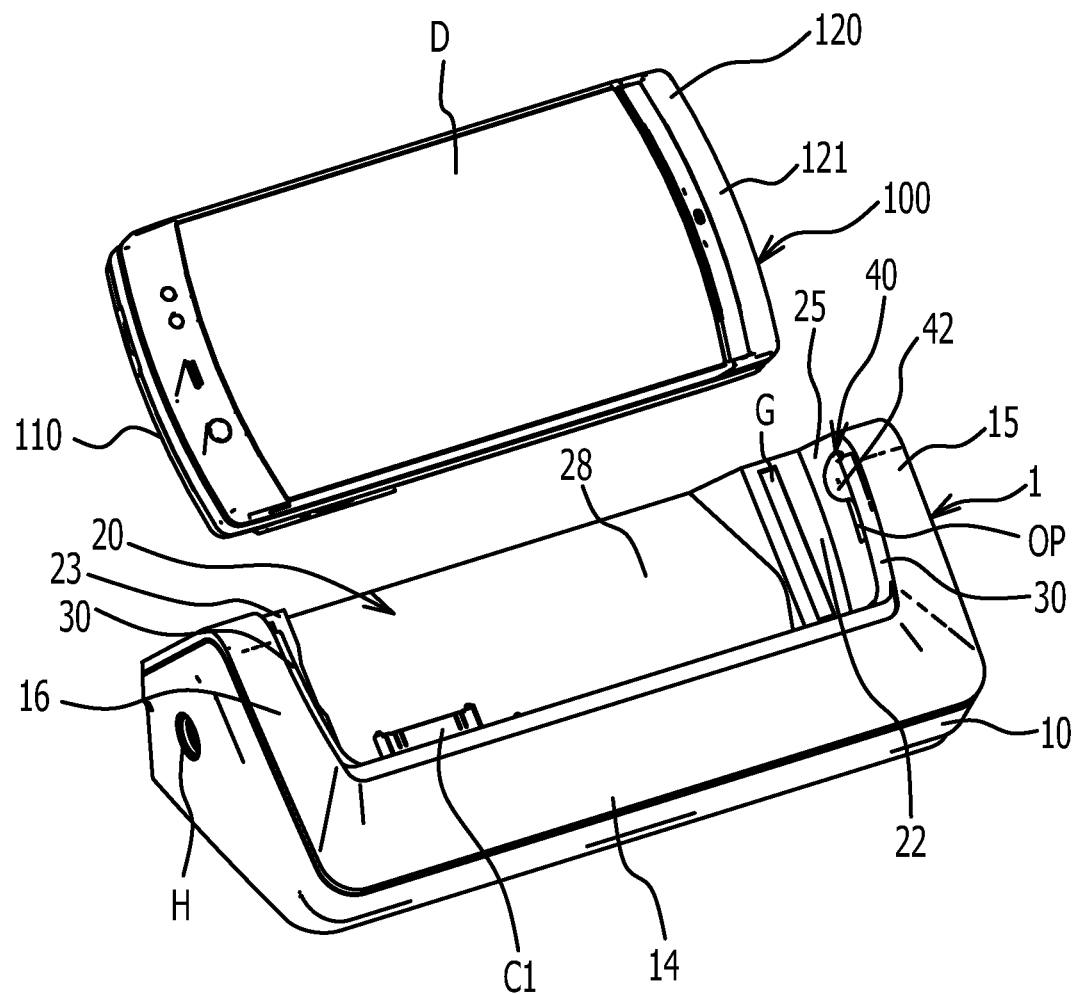
FIG. 2 is a diagram of the support device and a portable device.

FIG. 2 is a diagram of the support device 1 and a portable device 100. The portable device 100 is, for example, a portable phone. However, it is not limited thereto. The portable device 100 has casings 110 and 120 connected so as to slide relative to each other. The casings 110 and 120 are connected to each other such that the portable device 100 changes between the closed position and the opened position. In the closed position, the casing 120 overlaps the casing 110. In the opened position, the casing 120 overlaps the casing 110 with a smaller overlap than the closed position. The casing 110 is an example of a first casing, and the casing 120 is an example of a second casing. FIG. 2 is a diagram of the portable device 100 in the closed position. The casing 120 has a display D in a front 121.

The side wall 16 has an insertion hole H on the outside thereof, into which a cable for supplying power to the support device 1 is plugged. The fitting portion 20 has the support surface 22, described above, and side surfaces 25 continuous with the support surface 22. The support surface 22 has rubber members G for preventing the portable device 100 fitted to the fitting portion 20 from being damaged. The support surface 22 is inclined with respect to the vertical line when the support device 1 is disposed on a horizontal surface, and supports the portable device 100 fitted to the fitting portion 20 in an inclined position. This makes it easier for a user to view the display D. The support surface 23 has the same structure as the support surface 22.

The side surfaces 25 face the side surfaces of the portable device 100 fitted to the fitting portion 20. The side surfaces 25 each have the holding portions 30 and 40. The holding portions 30 are provided at positions away from the support surface 22, and the holding portions 40 are provided at positions close to the support surface 22 compared with the holding portions 30. The holding portions 30 project from the side surfaces 25 and extend along the edges of the side surfaces 25 on the front side. The holding portions 30 are fixed to the side surfaces 25.

Although it will be described in detail below, the holding portions 40 are lever-shaped and are disposed in the base 10 so as to be rotatable. A protrusion 42 formed at the tip of each lever-shaped holding portion 40 protrudes from an opening OP provided in the side surface 25. When the portable device 100 is not fitted to the fitting portion 20, the holding portions 40 protrude from the side surfaces 25 by a greater amount than the amount by which the holding portions 30 protrude from the side surfaces 25. The holding portions 30 and 40 are both made of, for example, synthetic resin. Although it will be described in detail below, the portable device 100 comes into contact with the holding portions 30 and 40 when the portable device 100 is fitted to or removed from the fitting portion 20. Therefore, the holding portions 30 and 40 are made of a material softer than the material of the base 10. For example, the base 10 is made of a polymer alloy, such as polycarbonate/acrylonitrile-butadiene-styrene (PC/ABS) alloy. For example, the holding portions 30 and 40 are made of polyacetal (POM). The holding portions 30 and 40 may be made of either the same material or different materials. The holding portions 30 and 40 will be described in detail below.

The holding portions 30 and 40 are provided also on the side wall 16. The holding portions 30 and 40 provided on the side wall 16 have the same structures as those provided on the side wall 15. Thus, only the holding portions 30 and 40 provided on the side wall 15 will be described below.

Figure 3:
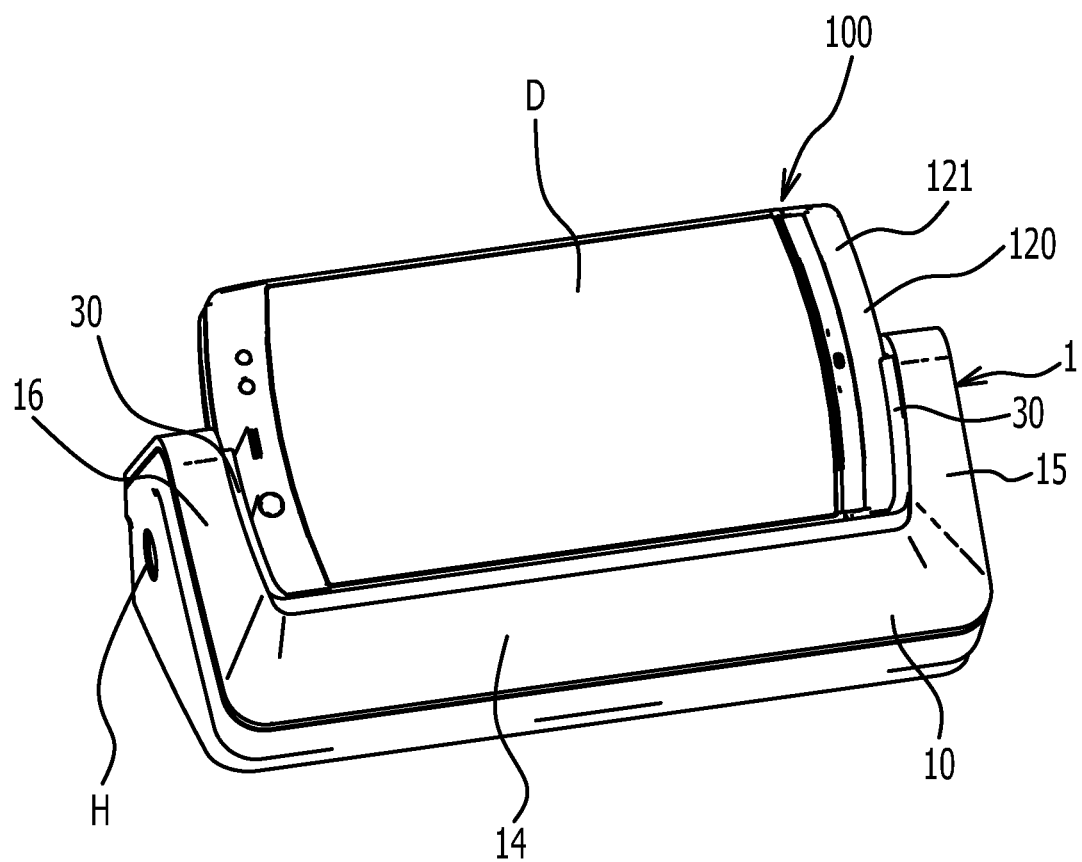
FIG. 3 is a diagram of a portable device in a closed position fitted to the support device.
Figure 4:
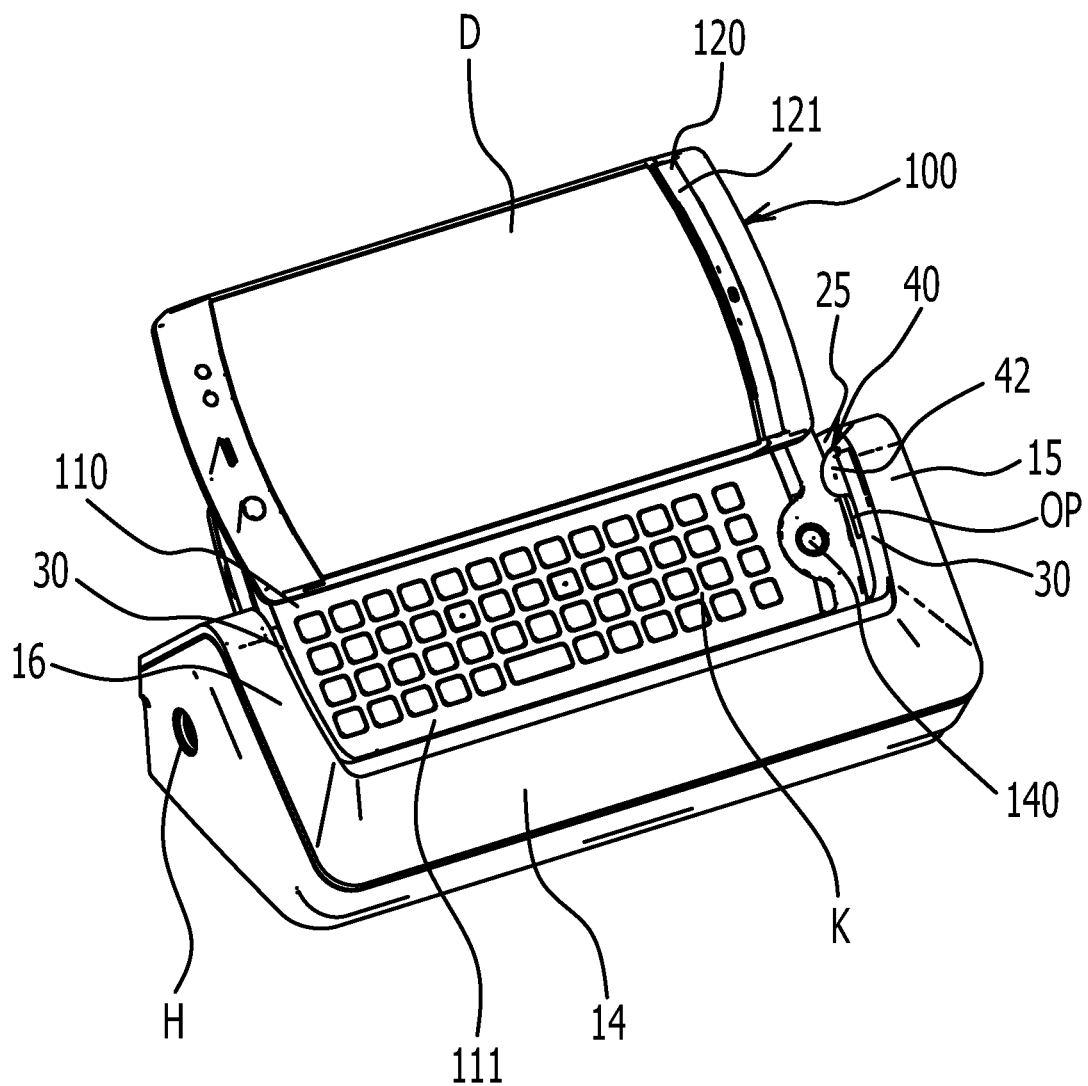
FIG. 4 is a diagram of a portable device fitted to the support device, which was changed from the closed position to an opened position.

FIG. 3 is a diagram of the portable device 100 in the closed position fitted to the support device 1. FIG. 4 is a diagram of the portable device 100 fitted to the support device 1, which was changed from the closed position to the opened position. The casing 110 has a keyboard K and a trackball 140 in a front 111. The keyboard K and the trackball 140 are examples of operation portions for giving instructions to the portable device 100. When the casing 120 of the portable device 100 in the closed position is slid relative to the casing 110, the keyboard K and the trackball 140 of the casing 110, hidden by the casing 120, are exposed. The portable device 100 is changed in form from the closed position to the opened position like this. A connector connectable to the connector C1 is provided on the casing 110. Accordingly, even if the portable device 100 is changed to the opened position while being fitted to the fitting portion 20, the electrical connection between the support device 1 and the portable device 100 is ensured.

When a user wishes to fit the portable device 100 in the closed position to the fitting portion 20, the user inserts the portable device 100 into a space between the support surface 22 and the holding portion 30. Thus, the portable device 100 in the closed position is guided in an insertion direction by the support surface 22 and the holding portion 30 and is fitted to the fitting portion 20, and the connector C1 and the connector of the portable device 100 are connected. At this time, the protrusion 42 of the holding portion 40 is pushed by the portable device 100 and moves into the side wall 15. The holding portion 30 faces the front 121 of the casing 120 and is located in front of the front 121. This prevents the portable device 100 from falling out of the fitting portion 20. More specifically, this prevents the portable device 100 fitted to the fitting portion 20 from being pulled toward the front side of the support device 1. Thus, the holding portion 30 serves to hold the portable device 100 in the closed position fitted to the fitting portion 20. When a user takes the portable device 100 in the closed position out of the space between the support surface 22 and the holding portion 30, the portable device 100 is removed from the fitting portion 20. Accordingly, the holding portion 30 also serves to guide the fitting and removal of the portable device 100 in the closed position.

As shown in FIG. 4, when the portable device 100 fitted to the fitting portion 20 is changed in form from the closed position to the opened position, the casing 120 slides off from the holding portion 40. As a result, the holding portion 40 protrudes again from the side surface 25 and returns to the initial position. Thus, the protrusion 42 of the holding portion 40 faces the edge of the front 111 of the casing 110 and is located in front of the front 111. This prevents the portable device 100 in the opened position from falling out of the fitting portion 20. More specifically, the portable device 100 fitted to the fitting portion 20 is prevented from being pulled toward the front side of the support device 1. Thus, the holding portion 40 serves to hold the portable device 100 in the opened position fitted to the fitting portion 20. When a user takes the portable device 100 in the opened position out of the space between the support surface 22 and the holding portion 40, the portable device 100 is removed from the fitting portion 20. Accordingly, the holding portion 40 also serves to guide the removal of the portable device 100 in the opened position.

When a user wishes to fit the portable device 100 in the opened position to the fitting portion 20, the user inserts the casing 110 into a space between the support surface 22 and the holding portions 40. Thus, the portable device 100 is guided in the insertion direction by the support surface 22 and the holding portion 40, and the connector C1 and the connector of the portable device 100 are connected. The portable device 100 in the opened position is thus fitted to the fitting portion 20. Accordingly, the holding portion 40 also serves to guide the fitting of the portable device 100 in the opened position.

As described above, the support device 1 has the connector C1. Because the holding portions 30 and 40 control the moving direction of the portable device 100 when connected to or disconnected from the connector C1, the load applied to the connector C1 during connecting or disconnecting is reduced.

Figure 5A:
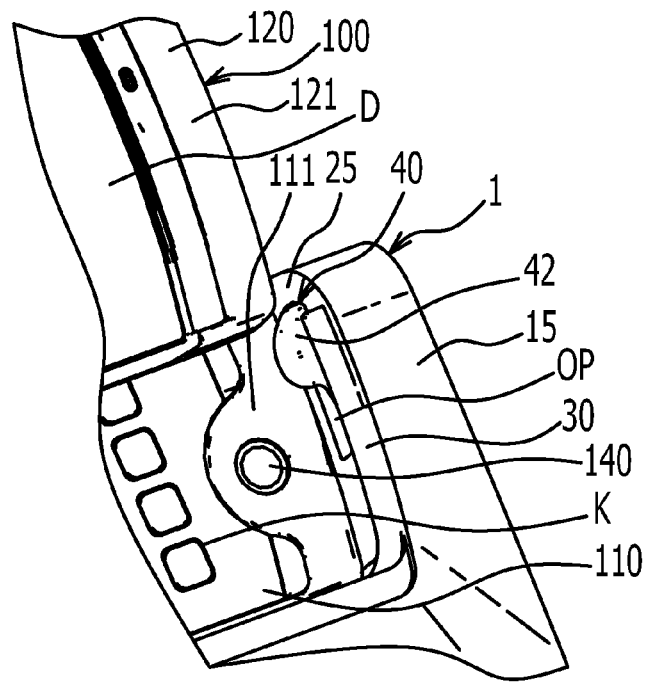
FIGS. 5A and 5B are diagrams showing the movement of a holding portion when the portable device fitted to the support device is changed in form from the opened position to the closed position.
Figure 5B:
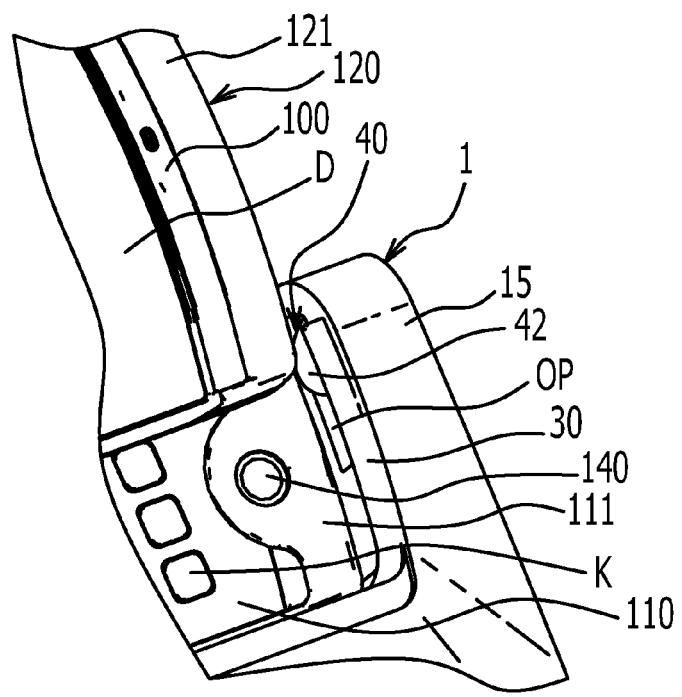

FIGS. 5A and 5B are diagrams showing the movement of the holding portion 40 when the portable device 100 fitted to the support device 1 is changed in form from the opened position to the closed position. The casing 120 slides relative to the casing 110 when pressed toward the support device 1. During sliding, the edge of the casing 120 comes into contact with the protrusion 42 of the holding portion 40, pushing the holding portion 40 toward the side wall 15. In this manner, the portable device 100 fitted to the fitting portion 20 changes from the opened position to the closed position.

Figure 6A:
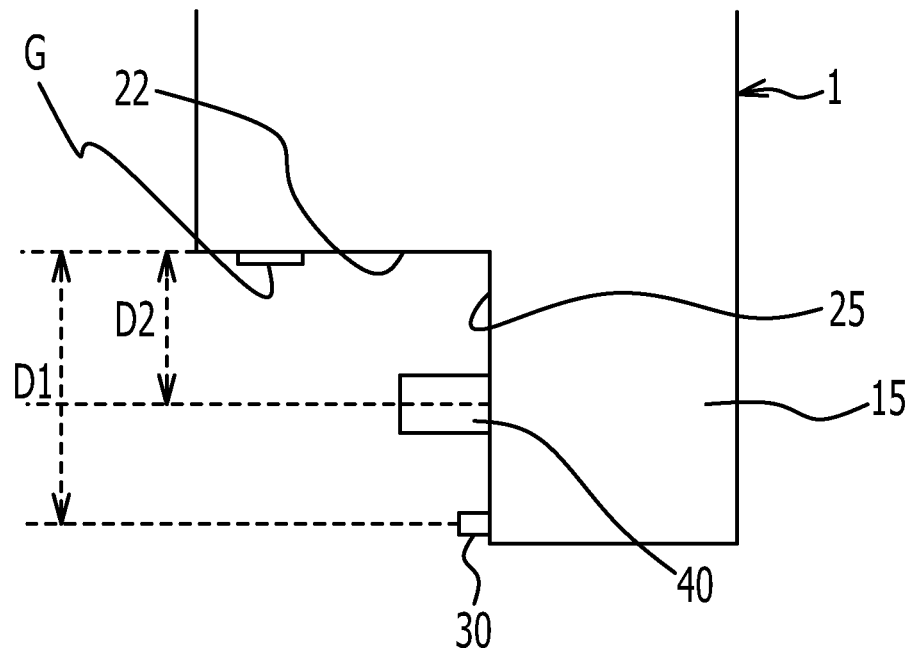
FIGS. 6A and 6B are diagrams showing the position of the holding portion.
Figure 6B:
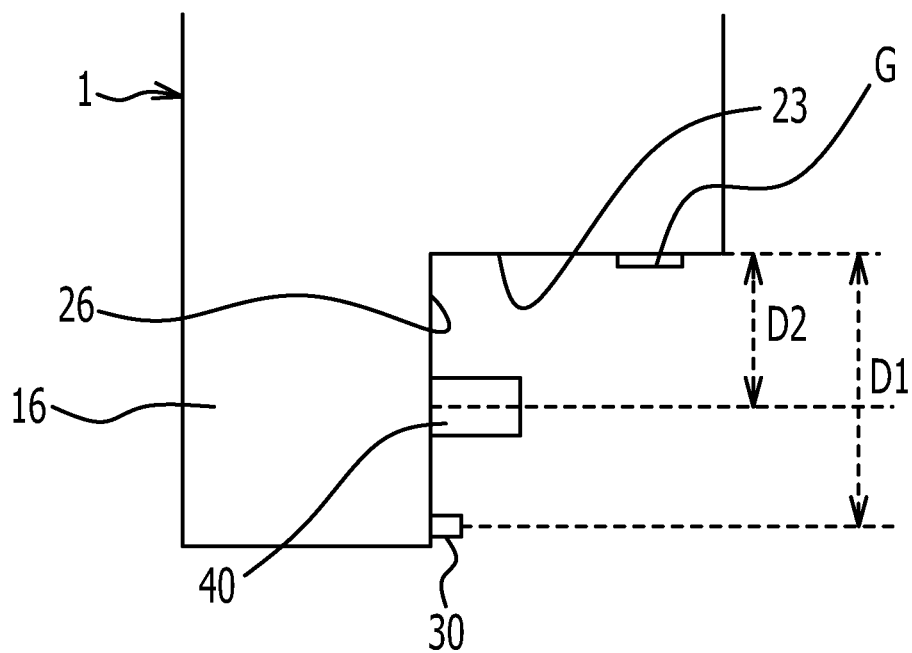

FIGS. 6A and 6B are diagrams showing the holding portions 30 and 40. FIG. 6A shows the holding portions 30 and 40 provided on the side wall 15. FIG. 6B shows the holding portions 30 and 40 provided on the side wall 16. As shown in FIG. 6A, the holding portions 30 and 40 are provided at positions separated away from the support surface 22 by a first distance D1 and a second distance D2, respectively. The second distance D2 is smaller than the first distance D1. The first distance D1 is set taking the thickness of both the casing 110 and casing 120 into consideration. The second distance D2 is set taking the thickness of the casing 110 into consideration. As shown in FIG. 6B, similarly to the holding portions 30 and 40 provided on the side wall 15, the holding portions 30 and 40 provided on the side wall 16 are provided at positions separated away from the support surface 23 by the first distance D1 and the second distance D2, respectively.

The holding portions 30 and 40 are provided at different distances from the support surface 22, taking into consideration the external dimensions of the portable device 100 that is changed in thickness of the portion fitted to the fitting portion 20. The holding portions 40 are provided such that they are capable of projecting and retracting from the side surfaces 25 of the fitting portion 20. Thus, the holding portions 30 or the holding portions 40 serve to hold the portable device 100 in the fitting portion 20, in response to a change in the external form of the portable device 100. Accordingly, the support device 1 is usable with the portable device 100 capable of changing its form. Furthermore, as described above, the holding portions 30 and 40 are provided on both the side walls 15 and 16. In other words, the side walls 15 and 16 each have a pair of the holding portions 30 and 40. Thus, the portable device 100 is stably held in the fitting portion 20.

Figure 7A:
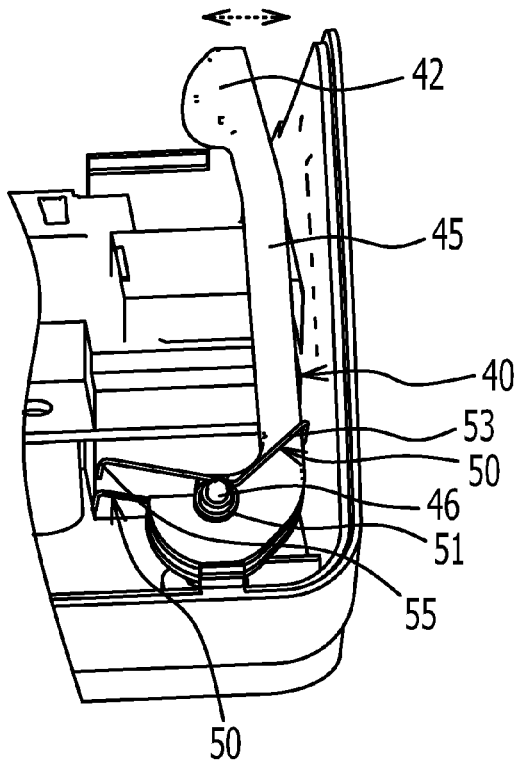
FIGS. 7A and 7B are diagrams showing the holding portion disposed in a base.
Figure 7B:
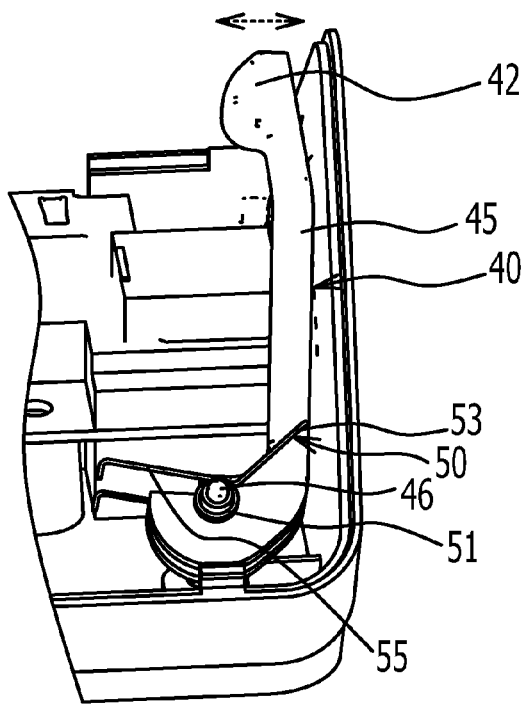

Next, the structure of the holding portion 40 will be described in more detail. FIGS. 7A and 7B are diagrams showing one of the holding portions 40 provided on the base 10. In FIGS. 7A and 7B, the internal structure of the base 10 is shown. FIG. 7A shows the holding portion 40 that is not pressed by the portable device 100, whereas FIG. 7B shows the holding portion 40 that is pressed by the portable device 100. The holding portion 40 includes the protrusion 42, an arm 45, and a connecting portion 46. The arm 45 extends in the side wall 15. The holding portion 40 is lever-shaped and is supported in the base 10 so as to be pivotable about the connecting portion 46. The connecting portion 46 is shaft-shaped. As the connecting portion 46 pivots, the protrusion 42 of the holding portion 40 projects or retracts from the side surface 25. It is also possible that the shaft is provided on the base 10 and a hole fitted to the shaft so as to be rotatable is provided in the holding portion 40.

The holding portion 40 has two bias members 50 for bringing the protrusion 42 to the initial position, i.e., a position at which the protrusion 42 projects from the opening OP in the side surface 25. The bias members 50 are metal torsion springs. The bias members 50 each include a coiled portion 51 and arms 53 and 55. The coiled portion 51 is wound around the connecting portion 46. The arm 53 is continuous with the coiled portion 51 and comes into contact with the arm 45 of the holding portion 40 at the tip. The arm 55 is continuous with the coiled portion 51 and is fixed to the base 10 at the tip. The arms 53 and 55 of the bias member 50 tend to be brought together by their own elastic restoring force. By this, the holding portion 40 is urged to return to the initial position. The bias members 50 may be coil springs.

If the connecting portion 46 is provided inside the side wall 15, the thickness of the side wall 15 increases. However, because the connecting portion 46 is provided in the front portion 14 off the side wall 15 in this embodiment, an increase in the thickness of the side wall 15 is prevented.

The holding portions 40 may be returned to the initial position by hand, without providing the bias members 50. The holding portions 40 do not necessarily have to be pivotable as in this case, but may be supported by the base 10 so as to be slidable.

Figure 8:
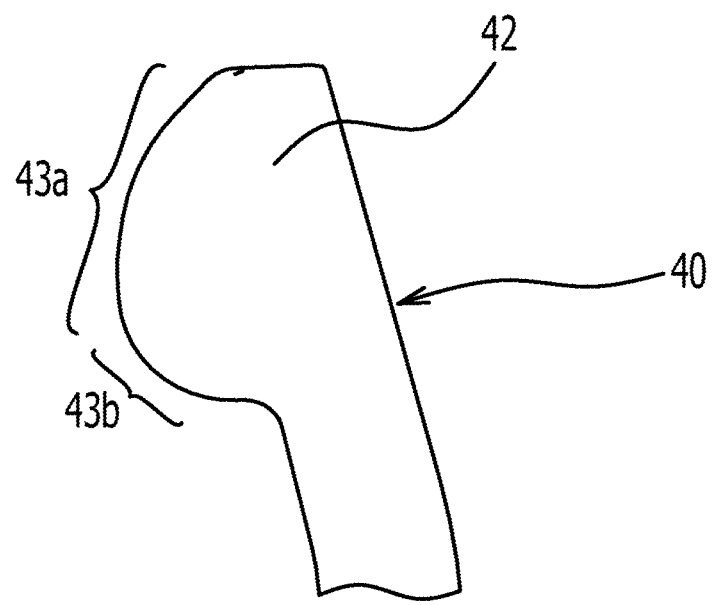
FIG. 8 is an enlarged view of a protrusion.

FIG. 8 is an enlarged view of the protrusion 42. The protrusion 42 includes a contact surface 43a and a non-contact surface 43b. The contact surface 43a is capable of coming into contact with the casing 120 of the portable device 100. The non-contact surface 43b does not come into contact with the casing 120 of the portable device 100. The contact surface 43a is continuous with the non-contact surface 43b. The radius of curvature of the non-contact surface 43b is smaller than the radius of curvature of the contact surface 43a. Because the contact surface 43a that is capable of coming into contact with the casing 120 has a large radius of curvature, the frictional resistance when the casing 120 makes a sliding contact with the contact surface 43a is suppressed. Furthermore, because the non-contact surface 43b has a small radius of curvature, the area of the front 111 of the casing 110 covered by the protrusion 42 when the portable device 100 fitted to the fitting portion 20 is in the opened position is small. Thus, the operation of the keyboard K and trackball 140 provided in the front 111 is easy when the portable device 100 fitted to the fitting portion 20 is in the opened position.

Furthermore, as shown in FIG. 4, when the portable device 100 fitted to the fitting portion 20 is in the opened position, the protrusion 42 is not located above the keyboard K or the trackball 140 provided on the portable device 100. Therefore, the user operation for the keyboard K and trackball 140 is ensured.

Although a preferred embodiment of the present invention was described in detail above, the present invention is not limited to a specific embodiment, but may be variously modified within the scope of the present invention described in the attached claims.

Although a portable phone was described as an example of the portable device in the above-described embodiment, the portable device may be other devices. Examples of the portable device include tablet computers, notebook computers, electronic dictionaries, PDAs, game machines, cameras, music players, navigation devices, etc. The support device 1 may simply serve as a charger.

Although the support device 1 according to the above embodiment includes the connector C1 that is connected to the portable device 100, such a connector does not necessarily have to be provided on the support device 1. That is, the support device 1 is not limited to one electrically connectable to the portable device 100. The support device 1 may simply serve as a base.

This embodiment was described taking the portable device 100 capable of changing its form as an example. However, two portable devices having different thicknesses may be fitted to the support device 1. For example, when a thick portable device is fitted to the fitting portion 20, the holding portions 30 hold the portable device, and when a thin portable device is fitted to the fitting portion 20, the holding portions 40 hold the portable device. In this manner, the support device 1 is used with a plurality of types of portable devices having different external dimensions.

Although this embodiment was described taking the portable device with the operation portion being provided in the front 111 of the casing 110 as an example, the portable device may be one that has the display provided in the front 111 of the casing 110. When such a portable device is fitted to the fitting portion 20, the holding portions 40 may be provided at positions where they do not overlap the display.

With this embodiment, it is possible to provide a support device that is used with a portable device capable of changing its form and that can be used with a plurality of types of portable devices having different external dimensions, and to provide a system having the same.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A support device comprising:
   a base;
   a fitting portion, to which a portable device is fitted, is provided in the base, the fitting portion includes a support surface that supports the portable device and a side surface continuous with the support surface;
   a first holding portion provided at a first distance from the support surface and fixed to the side surface; and
   a second holding portion provided at a second distance from the support surface and is projected from and retracted into the side surface, the second distance being smaller than the first distance.

2. The support device according to claim 1, further comprising:
   a bias member that projects from the side surface of the fitting portion and biases the second holding portion.

3. The support device according to claim 1, wherein the side surface has an opening, and
   the second holding portion includes a connecting portion connected to the base so as to be rotatable, an arm extending from the connecting portion, and a protrusion provided at a tip of the arm and projecting from the opening.

4. The support device according to claim 3, wherein the base includes a side wall that defines the side surface of the fitting portion,
   the connecting portion is located in the base off the side wall, and
   the arm extends in the side wall.

5. The support device according to claim 1, wherein a pair of the first holding portions are provided, and
   a pair of the second holding portions are provided.

6. The support device according to claim 1, wherein the support surface of the fitting portion is inclined with respect to the vertical line when the support device is disposed on a horizontal surface.

7. The support device according to claim 1, wherein the second holding portion includes a contact surface that is contacted with the portable device and a non-contact surface that is continuous with the contact surface and is not contacted with the portable device, and
   the non-contact surface has a smaller radius of curvature than the contact surface.

8. The support device according to claim 1, further comprising:
   a connector to be connected to the portable device when the portable device is fitted to the fitting portion.

9. The support device according to claim 1, further comprising:
   a connector configured to connect to an external device, to which external devices other than the portable device is connected.

10. A system comprising:
    a portable device; and
    a support device including a base and a fitting portion, to which a portable device is fitted, is provided in the base fitted,
      the fitting portion includes a support surface that supports the portable device and a side surface continuous with the support surface, and
      the support device includes a first holding portion provided at a first distance from the support surface and fixed to the side surface, and a second holding portion provided at a second distance from the support surface and is projected from and retracted into the side surface, the second distance being smaller than the first distance.

11. The system according to claim 10, wherein the portable device includes a first casing and a second casing connected to the first casing, the portable device being changed between a closed position and a opened position, the portable device overlapping the first casing in the closed position and overlapping the first casing in the opened position with a smaller overlap than the closed position.

12. The system according to claim 11, wherein when the portable device fitted to the fitting portion is in the closed position, the first holding portion is located in front of the second casing, and the second holding portion is pressed by the portable device, and
    when the portable device fitted to the fitting portion is in the opened position, the second holding portion projects from the side surface of the fitting portion and is located in front of the first casing.

13. The system according to claim 11, wherein the first casing includes at least one of an operation portion and a display, and
    when the portable device fitted to the fitting portion is in the opened position, the second holding portion is located in front of the first casing but does not overlie at least one of the operation portion and the display.

* * * * *